Aug. 23, 1932.     L. V. LUCIA     1,873,898
TOASTER
Filed Feb. 21, 1929
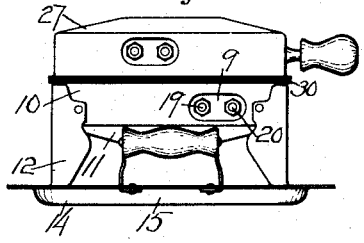
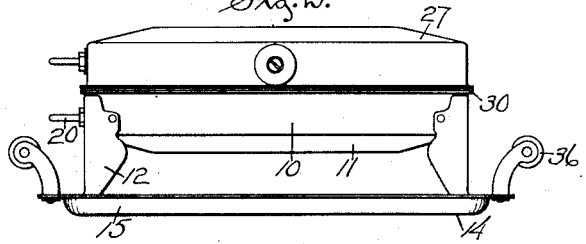
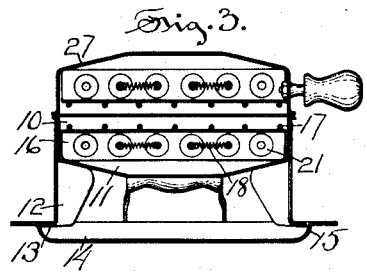
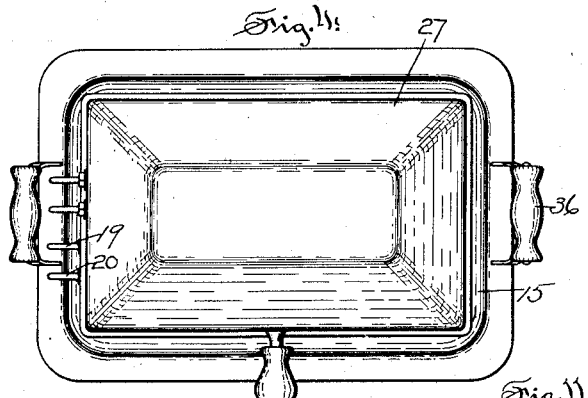
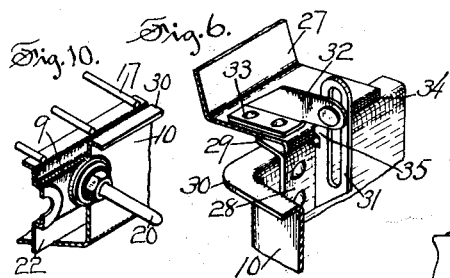
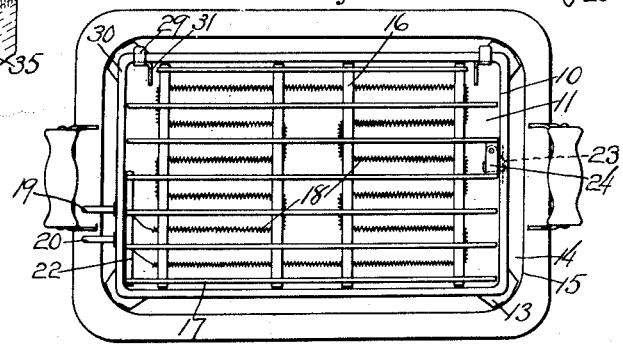
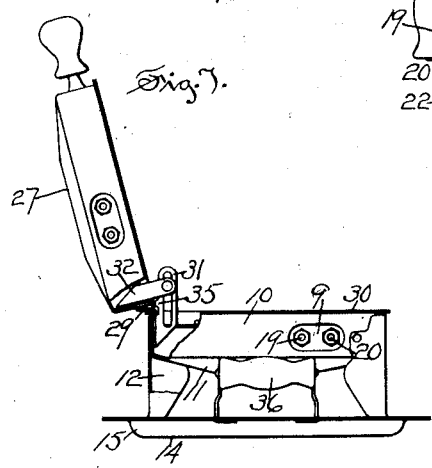
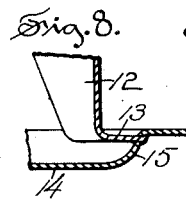
INVENTOR
Louis V. Lucia,
by
Arthur B. Jenkins
ATTORNEY Patented Aug. 23, 1932

1,873,898

UNITED STATES PATENT OFFICE

LOUIS V. LUCIA, OF HARTFORD, CONNECTICUT, ASSIGNOR TO THE BEARDSLEY AND WOLCOTT MANUFACTURING COMPANY, OF WATERBURY, CONNECTICUT, A CORPORATION OF CONNECTICUT

TOASTER

Application filed February 21, 1929. Serial No. 341,644.

My invention relates to that class of heating implements that are employed for toasting sandwiches, bread and other articles of food, and an object of my invention, among others, is the production of a device of this sort that shall be simple in construction, durable, attractive in appearance, and particularly effective in operation.

One form of a toaster embodying my invention, and in the construction and use of which the objects herein set out, as well as others, may be attained is illustrated in the accompanying drawing, in which—

Figure 1 is an end view of my improved toaster.

Figure 2 is a view in front elevation of the same.

Figure 3 is a view in cross section.

Figure 4 is a top view.

Figure 5 is a top view of the toaster base and tray.

Figure 6 is a detail isometric view, scale enlarged, illustrating the construction of the meeting edges at the back between the top and base of the toaster.

Figure 7 is an end view with the top raised, and with parts broken away to show construction.

Figure 8 is a detail enlarged sectional view illustrating the manner of joining the feet of the toaster to the tray.

Figure 9 is a detail isometric view, scale enlarged, illustrating the construction and operation of the retaining latch for the lower heating unit.

Figure 10 is a fragmental isometric view, scale enlarged, showing the manner of assembling the wire terminals and the case members to which the terminals are attached.

Figure 11 is a detail sectional view, scale enlarged, further illustrating the construction of the wire terminal assemblage.

In the accompanying drawing the numeral 10 denotes the base of my improved toaster that is preferably composed of sheet metal stamped to shape and of any desired form, that herein shown being of substantially rectangular shape when viewed in plan, and having a depressed bottom 11. Legs 12, also of sheet metal, are formed to fit the corners of the base and they project downwardly therefrom and terminate in feet 13.

As a protection against the transmission of undue heat from the bottom of the base, I provide a tray 14 underlying the base, and to lessen the danger from extreme heat, I secure the tray permanently in place by fastening the feet 13 thereto. As a further safeguard against undue transmission of heat, the bottom of the tray is depressed and the feet 13 are secured as near as possible to the upper edge of the rim 15, and as shown in Figure 8 of the drawing. The feet may be secured in any desired manner, as by riveting, welding or otherwise.

A toasting frame is removably positioned within the base 10 and the heating elements are mounted in this frame. In the construction herein shown this toasting frame comprises bars 16 extending crosswise of the base and having rods 17 secured thereto in any way that may be desired. These bars are preferably of angular shape in cross-section, thereby creating a lip at the top on which the rods 17 rest.

A heating element comprising a coiled length of wire 18 is extended back and forth through holes in the bars 16. In the present arrangement there are two heater sections, one at each end of the frame, and each comprising the lengths extended back and forth, the two sections being inter-connected and connected to terminals 19, 20 as shown in Figure 5. It will be understood, however, that the arrangement of the heater element in sections is not necessarily compelled, but that this may be departed from to a greater or lesser extent. It will be understood that the heating element is insulated from the frame in any suitable manner, as by means of insulators 21, through which the wire passes, which prevent the wire from touching the frame.

The terminals 19 and 20 are attached to a boss 9 on the terminal supporting bar 22 secured to the ends of the rods 17 as shown in Figures 5 and 10, and this boss passes loosely through an opening 8 in an end of the base 10 to permit ready removal of the toasting frame as hereinbefore mentioned, and at the same time remove any liability of the terminals 19 and 20 touching the edges of the openings 8 when the toaster is in operation.

As a further safeguard in this respect the boss 9 has two recesses 7 in which mica washers 6 fitting the pins or terminals are placed, these washers being substantially the same size as the recesses and thereby preventing the pins from touching the edges of the enlarged holes 5 in the bottoms of the recesses.

As another feature of this removability, the upright portions of the bars 16 may rest at their bottom edges on the bottom 11 of the base 10, and to retain said frame temporarily in place a latch 23 is pivotally attached to a latch support 24 secured at the opposite end of the frame from the wire terminals, said support being secured to and at the ends of rods 17, and as shown in Figure 9 of the drawing.

A nose on the latch is entered into a keeper 25 comprising a slot in an end of the base 10, and a finger piece 26 extends from the latch as a means for operating it.

The top 27 of my improved toaster is constructed, as to the enclosing case and the toasting frame including its heating element, substantially a counterpart of the base and its toasting frame, and the description of the top will, therefore, be confined to those features of construction wherein it differs from the base.

By preference the heating element in the top will be constructed to give out more heat than the heating element in the base and therefore to prevent any possibility of insertion in the base of a toaster frame intended for the top, and vice versa, the terminals 19 and 20 are so positioned that those on the top toaster frame cannot be inserted through the terminal openings in the base and as a natural result the terminals on the base toaster frame will not register with and cannot be projected through the terminal openings in the top.

The top is pivotally attached to the base by a hinge of novel construction located within and secured to the inner walls of the base and top. One hinge member comprises a base plate 28 secured to the inner surface of the base and having a lip 29 overturned upon a flange 30 at the upper edge of the base 10 and as shown in Figure 6 of the drawing. This member is formed from sheet metal and has an outturned support 31 with a slot therein to slidably receive a stud projecting from a finger 32 angularly bent from a base plate 33 of the other hinge member which is also formed from sheet metal and is secured in any suitable manner, as by riveting, to the inner surface of the top 27. This particular construction of the hinge readily adapts itself to a location within the structure which is a very desirable feature in toasters of this type.

It will be noted that the cover has not only a swinging movement but it may be bodily moved away from the base 10 by reason of the stud and slot connection. A lip 34 on the edge of the back wall of the top 27 is adapted, when the cover is in its open or raised position, to rest against a stop 35 on the edge of the support 31, and as shown in Figure 6 of the drawing. This stop positions the lip 34 on the top of the flange 30, thereby aiding in ready closing movement of the cover.

It will have been noted that the toaster has been herein described as secured to the tray 14, such tray being provided with handles 36. There is, therefore, no requirement for handles for the toaster, as one set of handles on the tray will answer the purpose for moving the tray whenever desired.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. A toaster including an enclosing case, a toaster frame supported within the case and including a heating element disposed upon said frame, terminals projecting from one end of the frame and positioned and spaced to pass through openings in said case, said frame being placeable by a transverse tipping movement after the terminals are in place and a latch pivotally supported on that end of the frame opposite the terminals and positioned to engage a keeper within the case, the terminals and latch mounting constituting supports for opposite ends of the toaster frame.

2. A toaster including a toaster member, a heating element located in said member, a terminal connected to said heating element, a supporting bar for said terminal, and a boss on said bar loosely fitting within an opening in the wall of said toaster member, said terminal being secured to and projecting through an enlarged opening in said boss.

3. A toaster including a toaster member, a heating element located in said member, a terminal connected to said heating element, a supporting bar for said terminal, a boss on said bar loosely fitting within an opening in the wall of said toaster member, said boss having a recess, said terminal being secured to and projecting through an enlarged opening in the bottom of said recess, and an insulating member secured to said terminal and substantially fitting said recess.

LOUIS V. LUCIA.